R. T. HOPKINS.
WHEEL HOLDER FOR USE IN JOURNAL BOX REPAIRS.
APPLICATION FILED OCT. 8, 1914.
1,158,688. Patented Nov. 2, 1915.
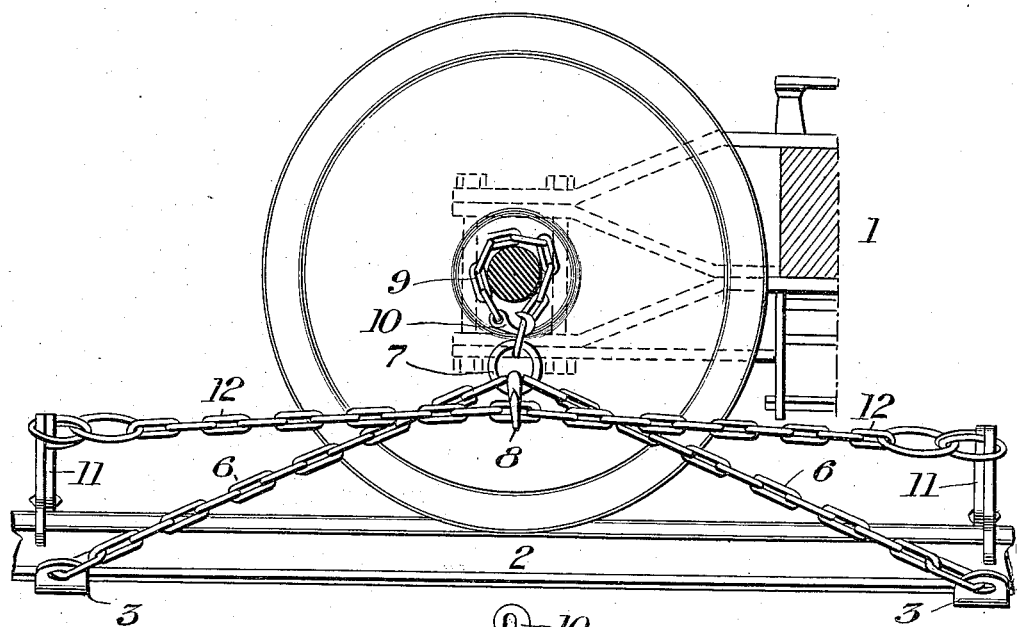
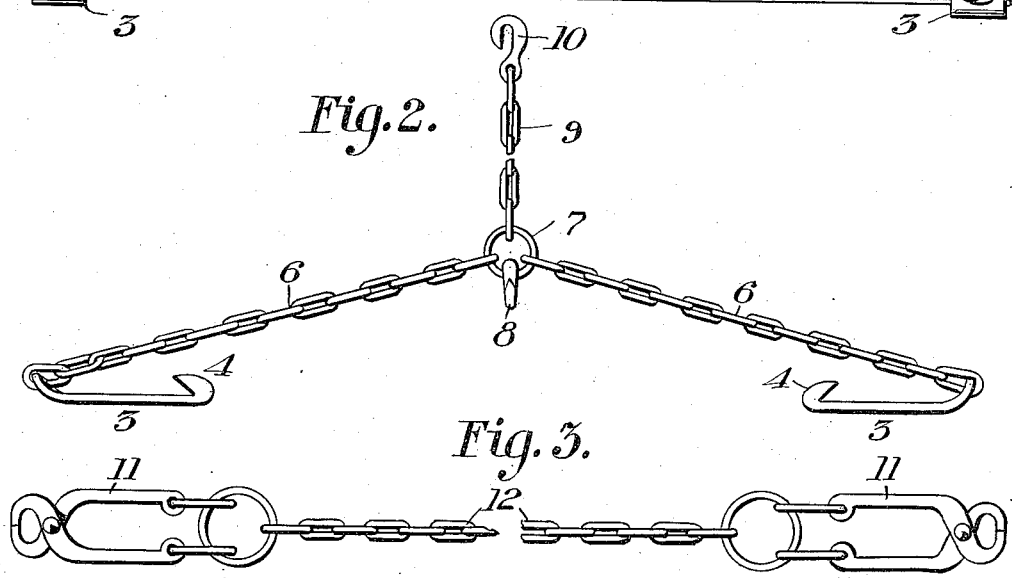

a # UNITED STATES PATENT OFFICE.

ROBERT T. HOPKINS, OF WINSTON-SALEM, NORTH CAROLINA.

WHEEL-HOLDER FOR USE IN JOURNAL-BOX REPAIRS.

1,158,688. Specification of Letters Patent. Patented Nov. 2, 1915.

Application filed October 8, 1914. Serial No. 865,724.

*To all whom it may concern:*

Be it known that I, ROBERT T. HOPKINS, a citizen of the United States, residing at Winston-Salem, in the county of Forsyth and State of North Carolina, have invented certain new and useful Improvements in Wheel-Holders for Use in Journal-Box Repairs, of which the following is a specification, reference being had therein to the accompanying drawing.

This invention relates to an improved device for use in repairing journal boxes, and contemplates the provision of simple, effective means for keeping the wheel and axle in fixed relation to the track when the journal box is raised to permit insertion or withdrawal of the bearings.

Considerable difficulty has been experienced with devices heretofore in use for this purpose. Those which attempt to connect the lower flange of the wheel with the track frequently slip when the journal box is jacked up, for the reason that the wheel and axle have longitudinal play, and no means are provided for resisting such movement; owing also to the fact that the flanges of wheels at present in use are not sufficiently angular to permit a good connection. This same objection holds good of jack blocks, and jacks provided with projecting members adapted to rest on the lower flange of the wheel while the journal box is being raised.

Instrumentalities adapted to connect the upper flange of the wheel with the journal box frequently damage either the flange or box, and do not prevent longitudinal movement of the wheel and axle. Those which require the partial rotation of the wheel are also impractical, for the reason that it is well nigh impossible in a long train, to effect the desired rotation without damage to the rigging, framework, or other portion of the car to which the device is secured.

A connection which will maintain wheel, axle and track rail in fixed relation, which will be capable of withstanding great strain, and which will prevent longitudinal movement of the wheel and axle when the box is raised, is the proper solution of this problem. Turn buckles and the like for adjustments, are impractical. The strain is so great that threads will be mutilated or stripped, and if made sufficiently strong to stand the strain they would be too cumbersome. The connection must also be made in such a manner as to avoid contact with brake-beams, shoes, rigging, etc., and my invention is devised with the object of eliminating the difficulties stated, and fulfilling the objects enumerated.

It may further be mentioned among the objects of this invention, that a simple, practical, light, compact device which may be easily carried from place to place, quickly applied and removed, and which will be economical of manufacture is a desideratum. Heretofore, repairs to bearings took up so much time, and tied up traffic for such a length of time, that frequently cars were taken from trains and side-tracked rather than attempt it. If they contained perishable goods, damage naturally resulted. Wrecks also resulted from the fact that rather than lose the time required to stop and repair a bearing engineers preferred to take a chance of reaching their destination before the bearing gave out.

The device comprising the subject matter of the present invention is light, strong, compact, and being easily applied and removed, facilitates quick repairs of bearings. It may be used by one man, where it frequently required a whole crew; it will maintain the wheel and axle against longitudinal movement; and fulfil other objects and advantages which will in part be obvious, and in part be made clear in the description which follows.

An embodiment of my invention is illustrated in the accompanying drawing, the following views being shown:—

Figure 1, is a view in elevation showing a practical application of one form of the device; Fig. 2, is a similar view of one of the components; Fig. 3, is a similar view of another component. Fig. 4, is a detail view of a rail attachment.

Referring specifically to the drawing, the numeral 1 designates generally a portion of a car truck, comprising a wheel, axle, journal box, rigging, etc., resting on a rail 2. For the purpose of securing the wheel to the rail when the journal box is jacked up to repair the bearings, and maintain the axle in fixed position, I provide a device, one form of which will now be described.

It consists essentially of a plurality of rail engaging hook members having a body portion 3 adapted to engage the under surface of the base of the rail, a hooked portion 4 to catch in the edge of the base, and an eye 5 for the reception of connecting members 6, here shown as links. These connecting members are joined at their opposite ends to a joining member 7 in the present embodiment shown as a ring, to which is also secured a hook 8.

An axle encircling member 9 is secured at one end to the member 7, and carries at its opposite end a hook or the like 10. The instrumentality just described forms one component of the apparatus which may be used separately, or in conjunction with the auxiliary holding element which will now be described. This auxiliary component comprises clamping members 11, adapted to embrace the head of the rail, and joined by a connecting member 12, so arranged that pressure thereon in an upward direction tends to clamp the members 11 more securely to the head of the rail.

In practical application, the hook members are slipped beneath the rail at opposite sides of the wheel, and secured to the edge of the base in front of the wheel. The axle encircling member 9 is brought around the axle on the inside of the wheel and pulled taut, when the hook 10 is secured to a link of the axle encircling member. The journal may now be jacked up to remove the bearings, but in the event that excessive weight or other conditions may render an auxiliary holding element desirable, the clamping members are placed in position on the head of the rail, the connecting member 12 placed in the hook 8, and the clamps spread apart on opposite sides of the wheel until the member 12 is taut, when the lifting of the journal may be accomplished.

This arrangement permits a great strain upon the securing devices without slipping or damage to the truck, as the application is such that all of the parts are clear of brake rods, beams, and all parts of the truck.

The device forming the subject of the present invention is simple, strong, light, easily applied, and has in practical use fulfilled the objects and advantages above enumerated.

While I have illustrated my invention in the embodiment herein shown, it will be understood that I do not wish to be limited to the precise construction of this disclosure, nor to any particular manner in which the same has been, or may be carried into effect, as many changes in the construction and arrangement of parts may be made without departing from the spirit of the invention, or sacrificing its chief advantages.

What I claim is:—

1. A wheel and axle holding device comprising in combination a plurality of hook members adapted to be secured to the base of a rail; connecting members secured to said hook members; a joining member secured to said connecting members; an axle encircling member secured to said joining member; and a securing instrumentality carried by said axle encircling member.

2. A wheel and axle holder comprising a plurality of hook members adapted to be secured to a rail, connecting members secured to said hook members, a joining member secured to said connecting members, an axle encircling member and a hook member secured to said joining member, and a securing instrumentality secured to said axle encircling member, as one component; and a plurality of rail head clamping devices connected by a member adapted to be secured to the hook on the joining member, as another component.

In testimony whereof I affix my signature in the presence of two subscribing witnesses.

ROBERT T. HOPKINS.

Witnesses:
CHAS. L. WHITMAN,
E. DOUTHET.

Copies of this patent may be obtained for five cents each, by addressing the "Commissioner of Patents, Washington, D. C."